United States Patent [19]

Treacy

[11] Patent Number: 5,309,453

[45] Date of Patent: May 3, 1994

[54] SINGLE PULSE INJECTION LOCKING

[75] Inventor: Edmond B. Treacy, Richland, Wash.

[73] Assignee: Jersey Nuclear-Avco Isotopes, Inc., Bellevue, Wash.

[21] Appl. No.: 290,794

[22] Filed: Jul. 27, 1981

[51] Int. Cl.⁵ .................. H01S 3/098; H01S 3/13; H01S 3/093

[52] U.S. Cl. ..................... 372/18; 372/32; 372/72; 359/340; 359/346; 359/347

[58] Field of Search ............. 372/18, 20, 23, 31, 372/32, 71, 72, 94, 19, 25; 330/4, 3; 356/350

[56] References Cited

U.S. PATENT DOCUMENTS

| | | | |
|---|---|---|---|
| 3,647,303 | 3/1972 | Kramer | 372/94 |
| 3,836,867 | 9/1974 | Smith et al. | 372/18 |
| 4,260,957 | 4/1981 | Congleton et al. | 372/22 |
| 4,264,870 | 4/1981 | Alcock et al. | 372/18 |
| 4,314,210 | 2/1982 | Everett | 372/18 |
| 4,393,503 | 7/1983 | Angelbeck et al. | 372/18 |

OTHER PUBLICATIONS

Alcock et al., "Injection Mode Locking . . . Laser", Mar. 1977, pp. 89-91, IEEE J. Q. A., QB 13, #3.
Mones et al., "Mode Locking . . . by Injection Locking", Mar. 1, 1976, A.P.L., vol. 28, #5.

*Primary Examiner*—Nelson Moskowitz
*Attorney, Agent, or Firm*—Weingarten, Schurgin, Gagnebin & Hayes

[57] ABSTRACT

A system for providing a single pulse of laser oscillator radiation of broad spectral range operative to excite a plurality of modes of a ring laser operating as an injection locked oscillator. In order to provide injection locking of the ring oscillator at multiple modes, a pump laser for the laser oscillator has its cavity length substantially similar to that of the laser oscillator thereby producing partial mode locking of the laser oscillator by amplitude modulation of the pump laser. In this manner the laser oscillator provides a single pulse of mode rich frequencies which are chosen within the band desired in the ring laser. This pulse continuously circulates within the cavity of the laser oscillator. The output of the laser oscillator through an output mirror thus forms a series of pulses separated in time by the roundtrip delay of the laser oscillator cavity. A single such pulse is selected by Pockels cell gating for injection into the ring oscillator. The segregation of the single pulse insures broad spectral content to that pulse as applied to the injection locked oscillator with a substantially uniform amplitude range. The single pulse is effective to excite a plurality of modes in the injection locked oscillator as is desired for the application of isotope separation.

11 Claims, 1 Drawing Sheet

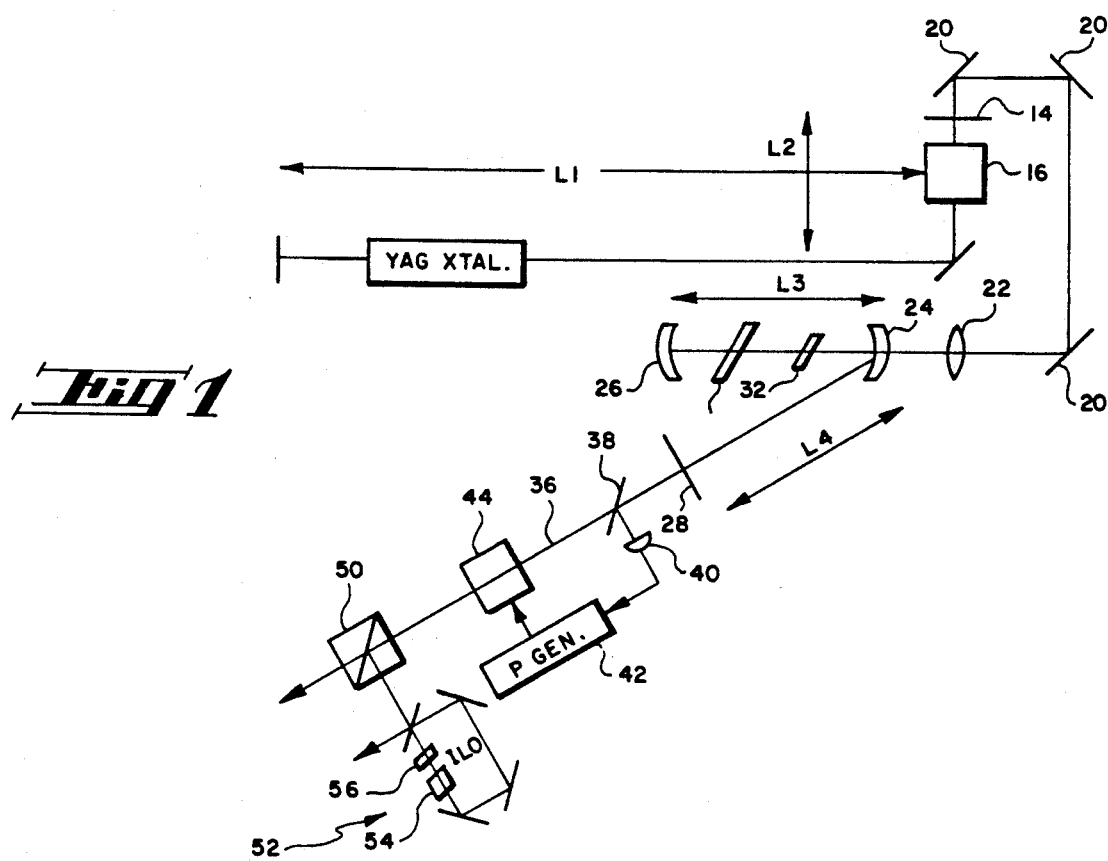
_Fig 1_
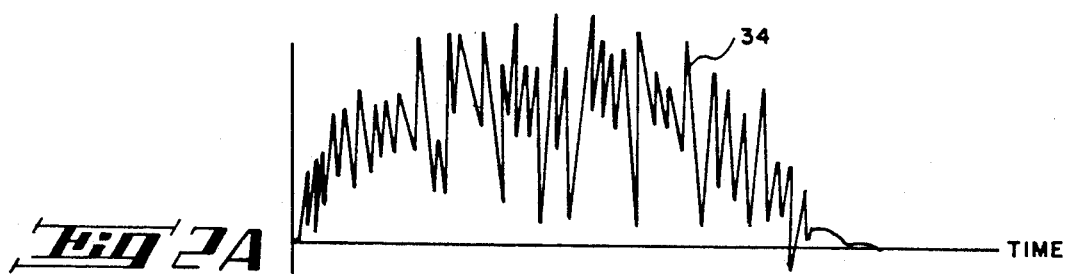
_Fig 2A_
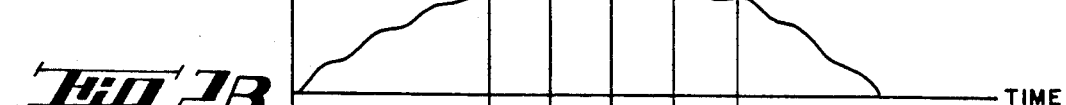
_Fig 2B_
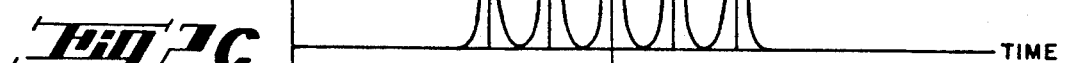
_Fig 2C_
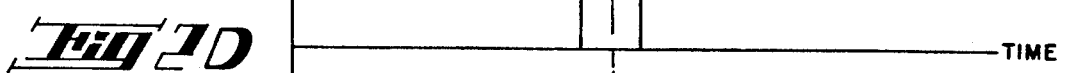
_Fig 2D_
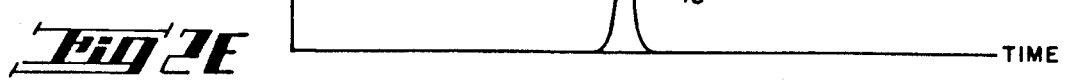
_Fig 2E_

SINGLE PULSE INJECTION LOCKING

FIELD OF THE INVENTION

The present invention relates to mode locking of laser oscillators and in particular to providing substantially equal amplitudes of mode locked radiation in an injection locked oscillator.

BACKGROUND OF THE INVENTION

In isotope separation where a single desired isotope species is to be selectively photoexcited and photoionized to permit electro or electromagnetic separation, laser radiation, typically from a dye laser injection locked oscillator, is provided of a frequency matching the excitation frequency of the desired isotope but not corresponding to excitation frequencies of other isotopes. It is known that the absorption spectrum for the desired isotope at any given absorption line is distributed over a predetermined although narrow bandwidth due to hyperline structure, Doppler or Zeeman effects. Accordingly it is desired to provide laser radiation which covers the narrow but nevertheless finite spectrum over which the desired isotope will absorb. This is typically accomplished by exciting a plurality of modes of a laser oscillator such as an injection locked oscillator in the configuration of a ring laser within a bandwidth corresponding to the absorption band of the desired isotope. Further improvements in efficiency can be achieved by frequency sweeping the plurality of modes at least one mode spacing to achieve complete spectral coverage of the absorption band.

In order for such a system to operate effectively it is first necessary to excite all of the modes over which an injection locked oscillator may oscillate within the specific bandwidth defined by frequency selective elements within the injection locked oscillator. In order to excite all modes of the injection locked oscillator it would normally be necessary to apply a multi-mode radiation to the oscillator with each mode matching a mode of the injection locked oscillator. Such a task becomes particularly difficult when a large number of modes are to be excited within the injection locked oscillator.

BRIEF SUMMARY OF THE INVENTION

In accordance with the teaching of the present invention a system is provided for exciting all modes of an injection locked oscillator within a predetermined bandwidth, typically selected to correspond to the absorption band of the desired isotope as in uranium enrichment. Excitation of all modes of an injection locked oscillator is provided by applying a single, isolated pulse from a laser oscillator tuned also to the absorption line for the desired isotope. The single, isolated pulse has a spectrum of uniform spectral coverage over a range matching the desired modes for excitation within the injection locked oscillator as specified by the Laplace transformation of the single pulse.

The single pulse is generated by mode locking a laser oscillator to pump radiation from a pump laser. The pump laser, typically a YAG, frequency-doubled laser, is partially mode locked and has an envelope of a generally noisy nature. By matching or nearly matching the cavity lengths of the pump laser to the laser oscillator, the pump envelope can be effective to reinforce lasing within the laser oscillator at pump envelope maxima thereby achieving mode locking of the laser oscillator. A single pulse of radiation is thus circulated within the laser oscillator and, using a partially reflecting output mirror, an output pulse sequence may be provided therefrom. A single pulse out of this sequence of pulses is selected, and, at a time appropriate in the excitation of the laser medium of the injection locked oscillator it is applied there to excite the injection locked oscillator at all modes within the spectral range of the single pulse. Tuning elements and cavity lengths are selected so that the single pulse frequency spectrum matches the desired spectral envelope of the injection locked oscillator and correspondingly the absorption band for the desired isotope. The broad spectral coverage of the single pulse, approximately uniform over a range which can be matched to the absorption band of the isotope, is effective to equally excite all modes of the injection locked oscillator within that band.

Single pulse extraction from the laser oscillator is typically provided by a polarization rotating crystal such as a Pockels cell which is triggered by photo detection of radiation in the output pulse. The polarization rotation is applied rapidly to encompass only one pulse within the output pulse sequence and a subsequent polarization sensitive crystal is then utilized to divert the single pulse from the output beam for application to the injection locked oscillator.

DESCRIPTION OF THE DRAWING

These and other features of the present invention are more fully setforth below in the following detailed description presented for exemplary purposes and the accompanying drawing of which:

FIG. 1 is a schematic diagram of a laser system embodying the present invention; and FIGS. 2A-2E are waveform diagrams useful in explaining the operation of the invention.

DETAILED DESCRIPTION OF THE DISCLOSURE

The present invention contemplates a system for exciting all modes of a multi-mode oscillator within a predetermined bandwidth by applying thereto a spectrum of radiation substantially covering that bandwidth. A broad, uniform spectrum of radiation from this oscillator is achieved by applying to it a single pulse of laser radiation.

To accomplish this goal, a laser system as illustrated in FIG. 1 is provided having a YAG laser comprising a cavity defined between first, 100 percent reflecting mirror 12 and second, partially reflecting output mirror 14 and having a YAG crystal 16 and, within the cavity, a second harmonic generator 18 for providing radiation of a generally green spectral output. A laser system suitable for this purpose is shown in greater detail in co-pending commonly assigned U.S. Pat. No. 4,260,957.

Radiation of a green spectral color from the output mirror 14 is directed, by optics 20 as necessary, through a converging lens 22 and mirror 24 into the cavity of a laser oscillator, dye laser defined between 100 percent reflecting end mirror 26 and partially reflecting output mirror 28. The laser oscillator contains a dye cell 30 which is laser pumped by the green radiation from the YAG laser to provide output radiation typically in the red/orange spectral region for isotopically selective photoexcitation of a uranium isotope. The input mirror 24 is typically dielectric layered in order to transmit the green radiation beam but to reflect the red/orange radiation generated by the dye cell 30. Frequency selective elements 32 may be provided within the cavity of the dye laser oscillator to define the spectral region of radiation for absorption by the desired isotope.

With respect to FIG. 2A, there is shown a waveform diagram 34 typical of the envelope of green radiation from the YAG laser as applied through the mirror 24. It is to be noted that the envelope contains substantial noise which typically will have a periodicity governed by the cavity length of the YAG laser, that is its effective length between the mirrors 12 and 14 indicated in FIG. 1 to be the length L1+L2. The laser oscillator is designed to have an effective cavity length defined by the distance between its mirrors 26 and 28 along the optical path as the sum of lengths L3+L4, substantially the same as the length of the YAG laser cavity, L1+L2. In this manner power maxima in the input green beam will reinforce the amplification within the dye cell 30 by the optical pumping thereof at times corresponding to the same points in the roundtrip travel of radiation within the laser oscillator cavity. This results in a modulation of the radiation within the oscillator as indicated in FIG. 2B. This will result in output radiation along an output path 36, after a substantial number of roundtrip passages to affect mode locking of the laser oscillator, as illustrated in FIG. 2C.

In order to select a single pulse of radiation in the pulse train represented by FIG. 2C, a beam splitter 38 is provided to divert a small portion of the radiation on the output path 36 to a photodetector 40 which in turn operates to trigger a pulse generator 42. The pulse generator 42 activates a Pockel cell polarization rotator 44 within the timing interval defined by a pulse waveform 46 illustrated in FIG. 2D timed to produce a 90° rotation of polarization on a single pulse 48 in the pulse train of FIG. 2C. In this manner, the radiation on the output beam 36 will have the single pulse 48 traveling with a 90 degree rotated polarization. A polarization sensitive crystal 50, such as a Glan-Thompson polarizing crystal, is then applied along the output path 36 beyond the Pockels cells 44 to deflect the single, polarization rotated pulse away from the output beam 36 for application to an injection locked oscillator 52 in the configuration of a ring oscillator having a dye medium 54 therein. Such oscillators are typically represented by the injection locked oscillators of commonly assigned U.S. Pat. Nos. 3,914,709 and 3,902,130.

The single pulse of radiation, pulse 48, as illustrated in FIG. 2E, thus separated from the output path 36 will have a Laplace transform of substantially uniform spectral content at the frequency specified by the lasing frequency within the laser oscillator. By matching this to the desired lasing frequency band of the injection locked oscillator, such as by similar frequency selective elements 56 there, it is possible to excite a plurality of modes, typically all the modes, within the injection locked oscillator 52, occupying the limited bandwidth for selective photo absorption by a uranium isotope.

The above examplary description is presented to illustrate the invention only, the actual scope of the invention being as indicated in the following claims.

What is claimed is:

1. A system for generating laser radiation having a spectrum substantially filling a bandwidth comprising:
    laser oscillator means for generating only a single mode locked pulse of radiation within said bandwidth circulating within a cavity associated with said laser oscillator means whereby said cavity experiences a succession of passes of said mode locked pulse;
    means for applying radiation from the single pulse from one pass of said mode locked pulse from said oscillator onto an output path, said single pulse having said spectrum;
    a pump laser providing excitation to said laser oscillator and having a cavity effective length approximately the same as the effective cavity length of said laser oscillator.

2. The system of claim 1 further including an injection locked laser having a plurality of modes and receiving said single pulse on said output path to generate within said injection locked laser a plurality of laser radiation modes.

3. The system of claim 2 wherein said injection locked laser includes means for defining a bandwidth therefore and said single pulse is effective to excite all modes within said bandwidth.

4. The system of claim 3 wherein said injection locked laser is a ring laser.

5. The system of claim 1 wherein said pump laser comprises a frequency-doubled YAG laser.

6. The system of claim 1 or 5 wherein said laser oscillator comprises a dye laser.

7. The system of claim 1 wherein:
    said laser oscillator includes a partially reflective cavity end mirror; and
    said means for applying a single pulse is operative to select a single pulse transmitted through said partially reflective end mirror outside said cavity.

8. The system of claim 1 or 7 wherein said means for applying a single pulse includes:
    means for sensing a pulse of laser radiation produced by said laser oscillator;
    means responsive to said sensed pulse for providing a rotation in polarization thereof; and
    means responsive to radiation of said laser oscillator for providing radiation of one polarization along a first path and radiation of the rotated direction of polarization along a second path.

9. A system for providing broad band single pulse laser radiation comprising:
    means for generating pump laser radiation within a cavity of a predetermined length, said radiation having a noisy envelope amplitude with the noise amplitude peaking at times which are a function of said cavity length;
    laser oscillator means having a medium pumped by said laser pump radiation with said noisy envelope and having a cavity of a length matching the length of said laser whereby said laser oscillator is mode locked by the envelope noise of said pump radiation and has only a single pulse of radiation travelling within said laser oscillator cavity;
    said pump laser having a lasing duration sufficient to provide within the cavity of said laser oscillator a plurality of traversals of laser radiation through the laser oscillator medium;
    means for selecting radiation from a single traversal of said single pulse of radiation from said laser oscillator to provide a pulse having a broad band spectrum.

10. The system of claim 9 wherein:
    said cavity has an end mirror partially reflective to provide an output path for radiation from said laser oscillator;

said single pulse selecting means includes means for providing a polarization rotation in the radiation passing through said partially reflective mirror and means for diverting radiation of rotated polarization from said output path.

11. The system of claims 9 or 10 further including a ring oscillator responsive to the single selected pulse of laser radiation to produce a plurality of modes of mode locked radiation within the cavity of said ring oscillator.

* * * * *